United States Patent

Kuroda et al.

[11] Patent Number: 5,179,833
[45] Date of Patent: Jan. 19, 1993

[54] SYSTEM FOR DETECTING DETERIORATION OF A THREE-WAY CATALYST OF AN INTERNAL COMBUSTION ENGINE

[75] Inventors: Shigetaka Kuroda; Yoichi Iwata, both of Wako, Japan

[73] Assignee: Honda Giken Kogyo Kabushiki Kaisha, Tokyo, Japan

[21] Appl. No.: 717,247

[22] Filed: Jun. 18, 1991

[30] Foreign Application Priority Data

Aug. 28, 1990 [JP]  Japan ................................. 2-226250

[51] Int. Cl.⁵ ............................................. F01N 3/20
[52] U.S. Cl. ...................................... 60/276; 60/277; 60/285
[58] Field of Search ................. 60/276, 277, 274, 285

[56] References Cited

U.S. PATENT DOCUMENTS

| | | | |
|---|---|---|---|
| 3,926,154 | 12/1975 | Williams | 60/276 |
| 3,962,866 | 6/1976 | Neidhard et al. | 60/276 |
| 3,969,932 | 7/1976 | Rieger et al. | 73/118.1 |
| 4,315,243 | 2/1982 | Calvert, Sr. | 123/198 R |
| 4,622,809 | 11/1986 | Abthoff et al. | 60/274 |
| 4,884,066 | 11/1989 | Miyata et al. | 60/277 |
| 5,018,348 | 5/1991 | Dürschmidt et al. | 60/274 |

FOREIGN PATENT DOCUMENTS 51-2960  8/1976  Japan .

Primary Examiner—Ira S. Lazarus
Assistant Examiner—L. Heyman
Attorney, Agent, or Firm—Armstrong, Westerman, Hattori, McLeland & Naughton

[57] ABSTRACT

A system for detecting deterioration of a three-way catalyst of an internal combustion engine comprises first and second HC sensors, and a central processing unit (CPU). The first and second HC sensors are arranged in the exhaust passage of the engine at locations upstream and downstream of the three-way catalyst, respectively, for detecting concentration of hydrocarbons present in exhaust gases. The central processing unit (CPU) is operable to compare an output from the first HC sensor with an output from the second HC sensor, and determine from results of the comparison whether the three-way catalyst is deteriorated.

8 Claims, 3 Drawing Sheets

SYSTEM FOR DETECTING DETERIORATION OF A THREE-WAY CATALYST OF AN INTERNAL COMBUSTION ENGINE

BACKGROUND OF THE INVENTION

This invention relates to a deterioration detecting system for detecting deterioration of a three-way catalyst of an internal combustion engine, and more particularly to a system of this kind which detects deterioration of a three-way catalyst based on outputs from two HC sensors arranged in an exhaust passage at locations upstream and downstream of the three-way catalyst, respectively, for detecting the concentration of hydrocarbons present in exhaust gases.

Conventionally a deterioration detecting system has been proposed e.g. by Japanese Patent Publication (Kokoku) No. 51-29260, which detects deterioration of a catalytic converter arranged in an exhaust system of an internal combustion engine by comparing outputs from two temperature sensors arranged in the exhaust passage at locations upstream and downstream of the catalytic converter, respectively.

Further, another deterioration detecting system has been proposed e.g. by U.S. Pat. No. 4,007,589, which detects deterioration of the catalytic converter by comparing outputs from two oxygen concentration sensors arranged in the exhaust passage at locations upstream and downstream of the catalytic converter, respectively.

However, neither of the above-proposed systems does not directly monitor the purifying performance of the catalytic converter, but detects temperatures of exhaust gases or values of concentration of oxygen present in same, to indirectly monitor the purifying performance of the catalytic converter by the use of the detected temperatures or values of concentration of oxygen, which makes it impossible to accurately detect deterioration of the catalytic converter.

Moreover, in the case of the former system using the temperature sensors, there is a time lag before the temperature of the catalytic converter is detected by the temperature sensor downstream of the catalytic converter, and hence there is a possibility of delayed detection of deterioration of the catalytic converter.

Further, in the case of the latter system using the oxygen concentration sensors, the oxygen concentration sensors have the output characteristic that normally the sensor output is inverted across the stoichiometric air-fuel ratio of an air-fuel mixture supplied to the engine. Therefore, the manner of detection of deterioration of the catalytic converter by the use of outputs from the oxygen concentration sensors is unavoidably complicated. Furthermore, the catalytic converter cannot be checked anytime but only under limited operating conditions of the engine.

SUMMARY OF THE INVENTION

It is the object of the invention to provide a deterioration detecting system for detecting deterioration of a three-way catalyst of an internal combustion engine, which is capable of accurately detecting deterioration of the three-way catalyst by the use of two HC sensors.

To attain the above object, the present invention provides a system for detecting deterioration of a three-way catalyst of an internal combustion engine having an exhaust passage, the three-way catalyst being arranged in the exhaust passage for purifying noxious components present in exhaust gases, the system comprising:

a first HC sensor arranged in the exhaust passage at a location upstream of the three-way catalyst for detecting concentration of hydrocarbons present in exhaust gases;

a second HC sensor arranged in the exhaust passage at a location downstream of the three-way catalyst for detecting concentration of hydrocarbons present in exhaust gases; and deterioration-determining means operable to compare an output from the first HC sensor with an output from the second HC sensor, and determine from results of the comparison whether the three-way catalyst is deteriorated.

Preferably, the system further includes memory means for storing at least one of a value of the output from the first HC sensor and a value of the output from the second HC sensor when the supply of fuel to the engine is interrupted, and correcting means for correcting at least one of values of the outputs from the first and second HC sensors by the at least one of the values of the outputs stored. The deterioration-determining means carries out comparison based on the at least one of the values of the outputs corrected by the correcting means.

More preferably, the deterioration-determining means determines whether the three-way catalyst is deteriorated, from results of comparison between a ratio of a value of the output from the second HC sensor to a value of the output from the first HC sensor and a predetermined value.

Further preferably, the deterioration-determining means determines that the three-way catalyst is deteriorated when the ratio of the value of the output from the second HC sensor to the value of the output from the first HC sensor is larger than a predetermined value.

Preferably, the deterioration-determining means determines whether the three-way catalyst is deteriorated, from results of comparison between an average value of the value of the output from the first HC sensor and an average value of the value of the output from the second HC sensor.

The above and other objects, features, and advantages of the invention will become more apparent from the ensuing detailed description taken in conjunction with the accompanying drawings.

DETAILED DESCRIPTION

The invention will now be described in detail with reference to the drawings showing an embodiment thereof.

Figure 1:
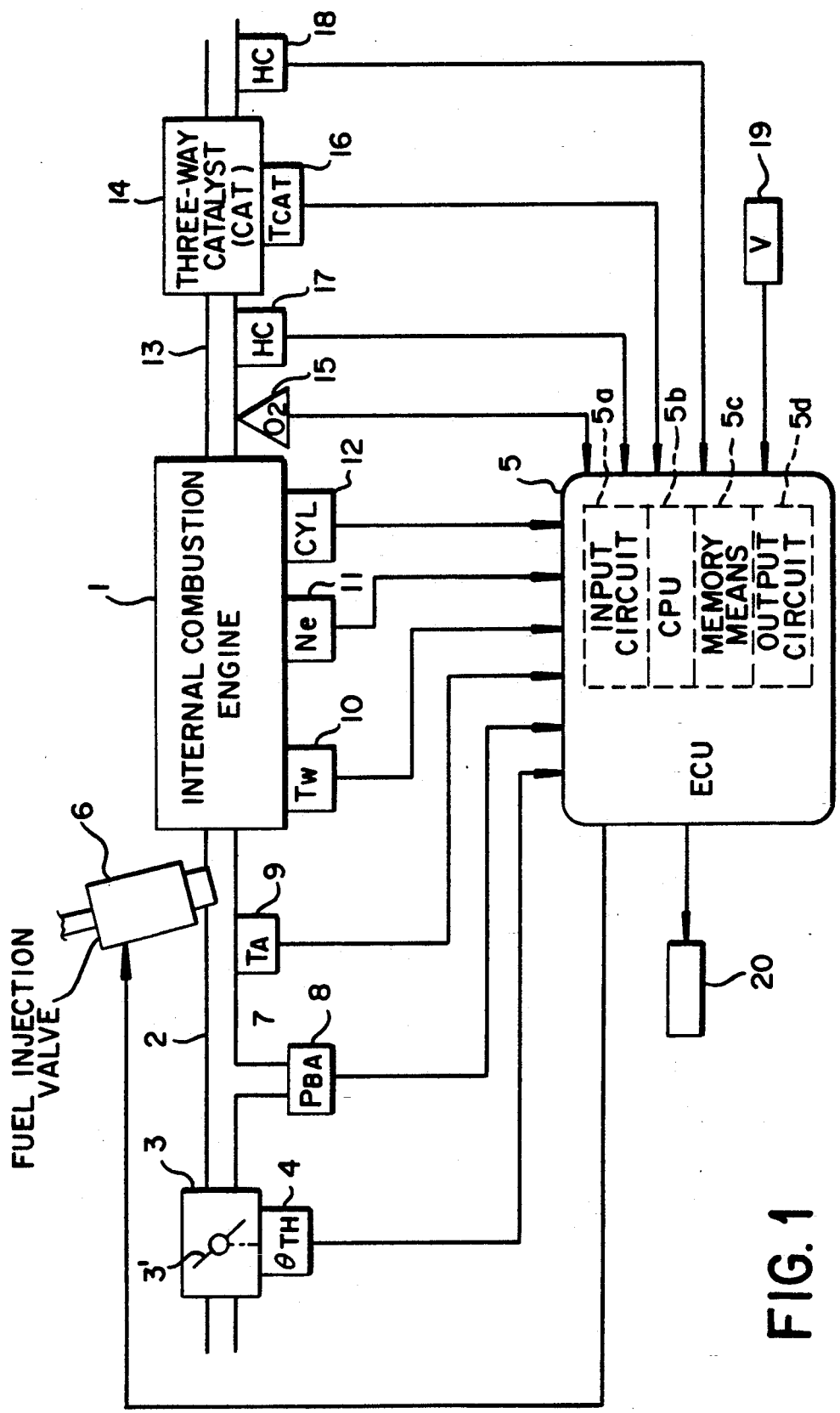
FIG. 1 is a schematic diagram showing the whole arrangement of a fuel supply control system for an internal combustion engine including a deterioration detecting system for detecting deterioration of a three-way catalyst according to the invention.

Referring first to FIG. 1, there is shown the whole arrangement of a fuel supply control system for an internal combustion engine, including a system for detecting the deterioration of a three-way catalyst according to the invention. In the figure, reference numeral 1 designates an internal combustion engine for automotive vehicles. Connected to the cylinder block of the engine 1 is an intake pipe 2 across which is arranged a throttle body 3 accommodating a throttle valve 3' therein. A throttle valve opening ($\theta_{TH}$) sensor 4 is connected to the throttle valve 3' for generating an electric signal indicative of the sensed throttle valve opening and supplying same to an electronic control unit (hereinafter called "the ECU") 5.

Fuel injection valves 6, only one of which is shown, are inserted into the interior of the intake pipe at location intermediate between the cylinder block of the engine 1 and the throttle valve 3' and slightly upstream of respective intake valves, not shown. The fuel injection valves 6 are connected to a fuel pump, not shown, and electrically connected to controlled by signals therefrom.

On the other hand, an intake pipe absolute pressure ($P_{BA}$) sensor 8 is provided in communication with the interior of the intake pipe 2 through a conduit 7 at a location immediately downstream of the throttle valve 3' for supplying an electric signal indicative of the sensed absolute pressure within the intake pipe 2 to the ECU 5. An intake air temperature ($T_A$) sensor 9 is inserted into the intake pipe 2 at a location downstream of the intake pipe absolute pressure sensor 8 for supplying an electric signal indicative of the sensed intake air temperature $T_A$ to the ECU 5.

An engine coolant temperature ($T_W$) sensor 10, which may be formed of a thermistor or the like, is mounted in the cylinder block of the engine 1, for supplying an electric signal indicative of the sensed engine coolant temperature $T_W$ to the ECU 5. An engine rotational speed (Ne) sensor 11 and a cylinder-discriminating (CYL) sensor 12 are arranged in facing relation to a camshaft or a crankshaft of the engine 1, neither of which is shown. The engine rotational speed sensor 11 generates a pulse as a TDC signal pulse at each of predetermined crank angles whenever the crankshaft rotates through 180 degrees, while the cylinder-discriminating sensor 12 generates a pulse at a predetermined crank angle of a particular cylinder of the engine, both of the pulses being supplied to the ECU 5. The ECU 5 calculates an engine rotational speed Ne based on the TDC signal pulses.

A three-way catalyst (CAT) 14 is arranged within an exhaust pipe 13 connected to the cylinder block of he engine 1 for purifying noxious components such as HC, CO, and NOx. An $O_2$ sensor 15 as an exhaust gas ingredient concentration sensor is mounted in the exhaust pipe 13 at a location between the three-way catalyst 14 and the engine 1, for sensing the concentration of oxygen present in exhaust gases emitted therefrom and supplying an electric signal in accordance with an output value thereof to the ECU 5. Further, a catalyst temperature ($T_{CAT}$) sensor 16 is mounted on the three-way catalyst 14 for detecting the temperature of same and supplying a signal indicative of the detected catalyst temperature $T_{CAT}$ to the ECU 5.

Figure 3:
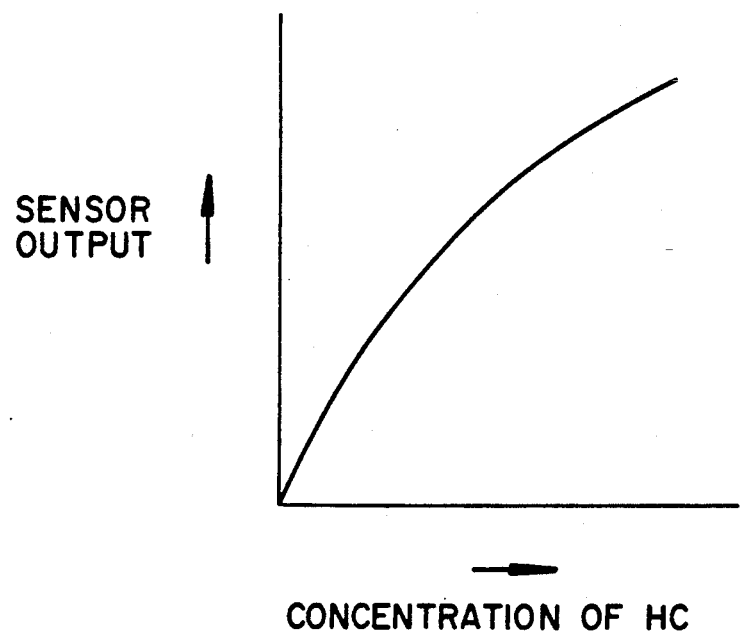
FIG. 3 is a view showing the output characteristic of the HC sensors 17, 18 appearing in FIG. 1.

Further, HC sensors 17, 18 are arranged in the exhaust pipe 13 at locations upstream and downstream of the three-way catalyst 14, respectively, for detecting the concentration of hydrocarbons present in exhaust gases, and supplying signals having output voltages corresponding to the detected concentration of hydrocarbons (HC) as shown in FIG. 3, to the ECU 5.

A vehicle speed sensor 19 is connected to the ECU 5 for detecting the vehicle speed V and supplying a signal indicative of the detected vehicle speed V to the ECU 5. Further connected to the ECU 5 is an LED (light emitting diode) 20 for raising an alarm when deterioration of the three-way catalyst 14 has been detected in a manner described in detail hereinbelow.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU") 5b for executing a deterioration detecting program described hereinafter etc., memory means 5c storing various operational programs which are executed in the CPU 5b, and a Ti map described hereinafter, and for storing results of calculations therefrom, etc., and an output circuit 5d which outputs driving signals to the fuel injection valves 6 and the LED 20.

The CPU 5b operates in response to the above-mentioned signals from the sensors to determine operating conditions in which the engine 1 is operating, such as an air-fuel ratio feedback control region in which the fuel supply is controlled in response to the detected oxygen concentration in the exhaust gases, and open-loop control regions including a fuel cut region, and calculates, based upon the determined operating conditions, the valve opening period or fuel injection period $T_{OUT}$ over which the fuel injection valves 6 are to be opened, by the use of the following equation (1) in synchronism with inputting of TDC signal pulses to the ECU 5:

$$T_{OUT} = T_i \times K_{O2} \times K_1 + K_2 \tag{1}$$

where $T_i$ represents a basic value of the fuel injection period $T_{OUT}$ of the fuel injection valves 6, which is read from a Ti map set in accordance with the engine rotational speed Ne and the intake pipe absolute pressure $P_{BA}$.

$K_{O2}$ is an air-fuel ratio feedback control correction coefficient whose value is determined in response to the oxygen concentration in the exhaust gases detected by the $O_2$ sensor 15, during feedback control, while it is set to respective predetermined appropriate values while the engine is in predetermined operating regions (the open-loop control regions) other than the feedback control region.

$K_1$ and $K_2$ are other correction coefficients and correction variables, respectively, which are calculated based on various engine parameter signals to such values as to optimize characteristics of the engine such as fuel consumption and driveability depending on operating conditions of the engine.

The CPU 5b supplies through the output circuit 5d, the fuel injection valves 6 with driving signals corresponding to the calculated fuel injection period $T_{OUT}$ determined as above, over which the fuel injection valves 6 are opened.

Figure 2:
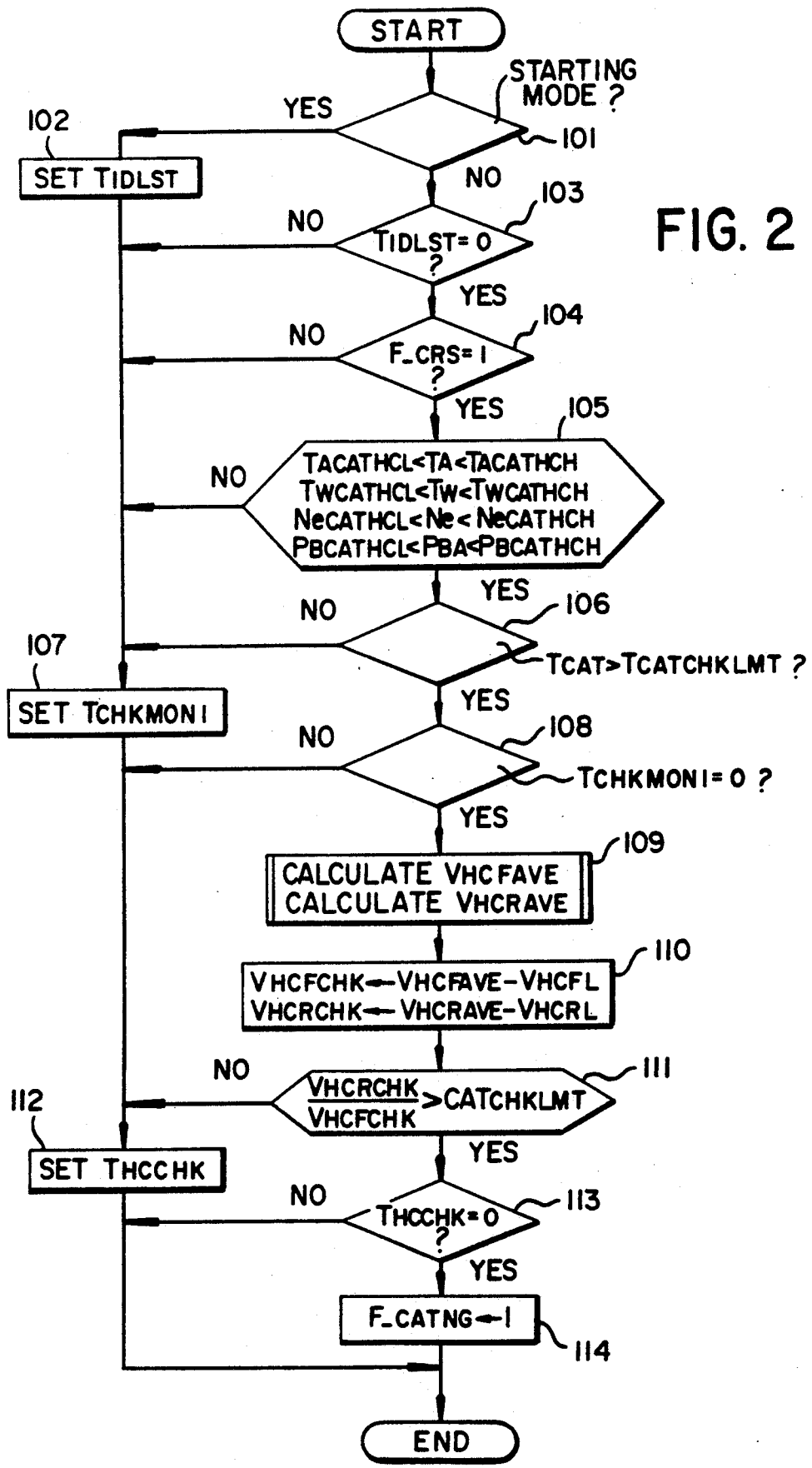
FIG. 2 is a flowchart of a program showing the manner of detection of deterioration of the three-way catalyst, executed by a CPU 5b appearing in FIG. 1.

The manner of detection of deterioration of the three-way catalyst 14 carried out by the deterioration detecting system according to the invention will now be described in detail with reference to FIG. 2 showing a control program therefor. The control program is executed by the CPU 5b whenever a TPC signal pulse is inputted to the ECU 5.

First, at a step 101, it is determined whether or not the engine 1 is in a starting mode. If the answer to this question is affirmative (Yes), a $t_{IDLST}$ timer formed of a down counter for measuring time elapsed after the engine 1 left the starting mode is set to a predetermined time period (e.g. two seconds) and started at a step 102, followed by the program proceeding to a step 107. On the other hand, if the answer to the question of the step 101 is negative (Yes), it is determined at a step 103 whether or not the count value of the $t_{IDLST}$ timer is equal to 0. If the answer to this question is negative (No), the program proceeds to the step 107, whereas if the answer is affirmative (Yes), i.e. if the predetermined time period $t_{IDLST}$ has elapsed after the engine left the starting mode to enter a normal operation mode, the program proceeds to a step 104.

At the step 104, it is determined whether or not a cruising-judging flag $F_{-CRS}$ assumes a value of 1. This flag is set by another routine such that it assumes the value of 1 when a rate of change $\Delta V$ in the vehicle speed V per two seconds is smaller than 0.8 km/h.

If the answer to the question of the step 104 is negative (No), the program proceeds to the step 107, whereas if the answer is affirmative (Yes), i.e. if the vehicle is in a cruising condition in which there is little change in the vehicle speed V, it is determined at a step 105 whether or not values of parameters indicative of operating conditions of the engine are suitable for detection of deterioration of the three-way catalyst 14. Specifically, determinations are carried out as to whether or not the intake air temperature $T_A$ is higher than a lower limit value $T_{ACATHCL}$ (e.g. 20° C.) and lower than a higher limit vale $T_{ACATHCH}$ (e.g. 80° C.), whether or not the engine coolant temperature $T_W$ is higher than a lower limit value $T_{WCATHCL}$ (e.g. 50° C.) and lower than a higher limit value $T_{WCATHCH}$ (e.g. 100° C.), whether or not the engine rotational speed Ne is higher than a lower limit value $Ne_{CATHCL}$ (e.g. 500 rpm) and lower than a higher limit value NeCATHCH (e.g. 4000 rpm), and whether or not the intake pipe absolute pressure $P_{BA}$ is higher than a lower limit value $P_{BCATHCL}$ (e.g. 260 mmHg) and lower than a higher limit value $P_{BCATHCH}$ (e.g. 510 mmHg).

If any of the answers to the questions of the step 105 is negative (No), it is judged that the engine is not in a condition suitable for carrying out the detection of deterioration of the three-way catalyst 14, and then the program proceeds to the step 107. On the other hand, if all the answers to the questions of the step 105 are affirmative (Yes), it is determined at a step 106 whether or not the catalyst temperature $T_{CAT}$ is higher than a lower limit value $T_{CATCHKLMT}$ (e.g. 450° C.) above which detection of the deterioration of the three-way catalyst 14 can be carried out.

If the answer to the question of the step 106 is negative (No), the program proceeds to the step 107, where a $t_{CHKMONI}$ timer formed of a down counter for measuring time elapsed after the engine entered the condition suitable for carrying out the detection of deterioration of the three-way catalyst 14 is set to a predetermined time period $t_{CHKMONI}$ (e.g. five seconds) and started, followed by the program proceeding to a step 112. If the answer to the question of the step 106 is affirmative (Yes), it is determined at a step 108 whether or not the count value of the $t_{CHKMONI}$ timer is equal to 0. If the answer to this question is negative, the program proceeds to the step 112, whereas if the answer is affirmative (Yes), i.e. if the predetermined time period $t_{CHKMONI}$ has elapsed after the engine entered the condition suitable for carrying out detection of the deterioration of the three-way catalyst 14 (all the answers to the questions of the steps 104 to 106 became affirmative), the program proceeds to steps 109 to 114 to carry out the detection of deterioration of the three-way catalyst 14.

At a step 109, by the use of an output value $V_{HCFAD}$ (digital value) of the HC sensor 17 upstream of the three-way catalyst 14 and an output value $V_{HCRAD}$ (digital value) of the HC sensor 18 downstream of the three-way catalyst 14, an average output value $V_{HCFAVE}$ of the HC sensor 17 and an average output value VHCRAVE of the HC sensor 18 are calculated by the following equations (2) and (3), respectively:

$$V_{HCFAVE} = \quad (2)$$

$$V_{HCFAD} \times (C_{HCAVE}/100) + V_{HCFAVE} \times [(100 - C_{HCAVE})/100]$$

$$V_{HCRAVE} = \quad (3)$$

$$V_{HCRAD} \times (C_{HCAVE}/100) + V_{HCRAVE} \times [(100 - C_{HCAVE})/100]$$

$V_{HCFAVE}$ and $V_{HCRAVE}$ on the right side of the above equations represent output values $V_{HCFAVE}$ and $V_{HCRAVE}$ obtained up to the last loop by the equations (2) and (3), and $C_{HCAVE}$ represents a predetermined numerical value selected from the range of 1 to 100.

At the following step 110, a zero point correction value $V_{HCFL}$ for the HC sensor 17 is subtracted from the average output value $V_{HCFAVE}$ to obtain a corrected average output value $V_{HCFCHK}$ of the HC sensor 17, and a zero point correction value $V_{HCRL}$ for the HC sensor 18 is subtracted from the average output value $V_{HCRAVE}$ to obtain a corrected average value $V_{HCRCHK}$ of the HC sensor 18. The zero point correction values $V_{HCFL}$ and $V_{HCRL}$ are output values of the HC sensors 17 and 18 stored when the engine 1 was subjected to fuel cut (interruption of fuel supply). These output values stored should normally be zero, but if they do not assume a value of 0, it is necessary to correct the output values of the HC sensors 17 and 18, and therefore the average output values $V_{HCFAVE}$ and $V_{HCRAVE}$ are corrected by these values.

At the following step 111, it is determined whether or not the ratio of the corrected average output value $V_{HCRCHK}$ of the HC sensor 18 downstream of the three-way catalyst 14 to the average output value $V_{HCFCHK}$ of the HC sensor 17 upstream of same is larger than a predetermined value $CAT_{CHKLMT}$ (e.g. a value corresponding to a HC purifying ratio of 50 %). If the answer to this question is negative (No), i.e. if the concentration of HC detected by the HC sensor 18 downstream of the three-way catalyst 14 is lower than 50 % of the concentration of HC detected by the HC sensor 17 upstream of the three-way catalyst, it is judged that the three-way catalyst 14 is not deteriorated, and the program proceeds to the step 112, where a $t_{HCCHK}$ timer formed of a down counter for measuring the duration of a state in which deterioration of the three-way catalyst 14 is detected is set to a predetermined time period $t_{HCCHK}$ (e.g. 10 seconds) and started.

On the other hand, if the answer to the question of the step III is affirmative (Yes), it is determined at a step 113 whether or not the count value of the $t_{HCCHK}$ timer is equal to 0. If the answer to this question is negative (No), the present program is terminated, whereas if the answer is affirmative (Yes), i.e. if the state in which deterioration of the three-way catalyst was detected (the answer to the question of the step 111 is affirmative) has continued over the predetermined time period $t_{HCCHK}$, it is judged that the three-way catalyst 14 is deteriorated, and a deterioration flag $F_{-CATNG}$ is set to a value of 1 at a step 114, followed by terminating the present program.

When the deterioration flag $F_{-CATNG}$ is set to 1, a signal for driving the LED 20 is generated by another routine, whereby the driver is warned of the deterioration of the three-way catalyst 14.

Thus, according to the system of the present invention, the purifying performance of the three-way catalyst can be directly monitored, and hence deterioration of the three-way catalyst can be accurately detected.

Although, in the above described embodiment, the two HC sensors are used only for detection of deterioration of the three-way catalyst, this is not limitative, but the output value of the HC sensor upstream of the three-way catalyst may be also used for the feedback control of the air-fuel ratio in place of the $O_2$ sensor 15.

Further, although, in the above described embodiment, the ratio between the average output values, $V_{HCFCHK}$, $V_{HCRCHK}$ of the HC sensors 17, 18 was used for determination of deterioration of the three-way catalyst 14, a difference between the two values $V_{HCFCHK}$, $V_{HCRCHK}$ may be used, instead.

What is claimed is:

1. A system for detecting deterioration of a three-way catalyst of an internal combustion engine having an exhaust passage, said three-way catalyst being arranged in said exhaust passage for purifying noxious components present in exhaust gases, said system comprising:
   a first HC sensor arranged in said exhaust passage at a location upstream of said three-way catalyst for detecting concentration of hydrocarbons present in exhaust gases and providing a first output signal substantially proportional to the concentration of hydrocarbons at said upstream location;
   a second HC sensor arranged in said exhaust passage at a location downstream of said three-way catalyst for detecting concentration of hydrocarbons present in exhaust gases and providing a second output signal substantially proportional to the concentration of hydrocarbons at said downstream location; and
   deterioration-determining means for comparing said first output from said first HC sensor with said second output from said second HC sensor and for determining from results of said comparison whether said three-way catalyst is deteriorated.

2. A system according to claim 1 wherein said deterioration-determining means determines whether said three-way catalyst ia deteriorated, from results of comparison between a ratio of a value of said output from said second HC sensor to a value of said output from said first HC sensor and a predetermined value.

3. A system according to claim 2, wherein said deterioration-determining means determines that said three-way catalyst is deteriorated when said ratio of said value of said output from said second HC sensor to said value of said output from said first HC sensor is larger than a predetermined value.

4. A system according to claim 1, wherein said deterioration-determining means determines whether said three-way catalyst is deteriorated, from results of comparison between an average value of said value of said output from said first HC sensor and an average value of said value of said output from said second HC sensor.

5. A system for detecting deterioration of a three-way catalyst of an internal combustion engine having an exhaust passage, said three-way catalyst being arranged in said exhaust passage for purifying noxious components present in exhaust gases, an oxygen concentration sensor arranged in said exhaust passage for detecting concentration of oxygen in said exhaust gases, and air-fuel ratio feedback control means for controlling an amount of fuel supplied to said engine in response to an output from said oxygen concentration sensor, said system further comprising:
   a first HC sensor arranged in said exhaust passage at a location upstream of said three-way catalyst for detecting concentration of hydrocarbons present in exhaust gases and providing a first output signal substantially proportional to the concentration of hydrocarbons;
   a second HC sensor arranged in said exhaust passage at a location downstream of said three-way catalyst for detecting concentration of hydrocarbons present in exhaust gases and providing a second output signal substantially proportional to the concentration of hydrocarbons; and
   deterioration-determining means for comparing said first output from said first HC sensor with said second output from said second HC sensor and for determining from results of said comparison whether said three-way catalyst is deteriorated.

6. A system for detecting deterioration of a three-way catalyst of an internal combustion engine having an exhaust passage, said three-way catalyst being arranged in said exhaust passage for purifying noxious components present in exhaust gases, said system comprising:
   a first HC sensor arranged in said exhaust passage at a location upstream of said three-way catalyst for detecting concentration of hydrocarbons present in exhaust gases;
   a second HC sensor arranged in said exhaust passage at a location downstream of said three-way catalyst for detecting concentration of hydrocarbons present in exhaust gases;
   deterioration-determining means for comparing an output from said first HC sensor with an output from said second HC sensor and for determining from results of said comparison whether said three-way catalyst is deteriorated;
   memory means for storing at least one of a value of said output from said first HC sensor and a value of said output from said second HC sensor when the supply of fuel to said engine is interrupted; and
   correcting means for correcting at least one of the values of said outputs from said first and second HC sensors by said at least one of said values of said outputs stored, wherein said deterioration-determining means carries out comparison based on said at least one of said values of said outputs corrected by said correcting means.

7. A system according to claim 6, wherein said deterioration-determining means determines whether said three-way catalyst is deteriorated, from results of comparison between a ratio of a value of said output from said second HC sensor to a value of said output from said first HC sensor and a predetermined value.

8. A system according to claim 7, wherein said deterioration-determining means determines that said three-way catalyst is deteriorated when said ratio of said value of said output from said second HC sensor to said value of said output from said first HC sensor is larger than a predetermined value.

* * * * *